July 19, 1955 G. RAISBECK ET AL 2,713,665
TRANSISTOR MODULATOR CIRCUITS
Filed Nov. 9, 1950 4 Sheets-Sheet 1

INVENTORS. G. RAISBECK
R. L. WALLACE, JR.
BY Harry C. Hart
ATTORNEY

INVENTORS. G. RAISBECK
R. L. WALLACE, JR.
BY Harry C. Hart
ATTORNEY

July 19, 1955 G. RAISBECK ET AL 2,713,665

TRANSISTOR MODULATOR CIRCUITS

Filed Nov. 9, 1950 4 Sheets-Sheet 3

INVENTORS. G. RAISBECK
R. L. WALLACE, JR.

BY Harry C. Hart
ATTORNEY

INVENTORS. G. RAISBECK
R. L. WALLACE, JR.
BY Harry C. Hart
ATTORNEY

United States Patent Office 2,713,665

Patented July 19, 1955

2,713,665

TRANSISTOR MODULATOR CIRCUITS

Gordon Raisbeck, Morristown, and Robert Lee Wallace, Jr., Plainfield, N. J., assignors to Bell Telephone Laboratories, Incorporated, New York, N. Y., a corporation of New York Application November 9, 1950, Serial No. 194,837

8 Claims. (Cl. 332—31)

This invention relates to transistor circuits and especially to transistor circuits for modulating a carrier wave by a modulating signal.

The principal object of the invention is to provide new modulator circuits which take advantage of the peculiar characteristics of transistors.

In three applications for patent filed September 12, 1950, Serial Nos. 184,457; 184,458; and 184,459 it is shown that the transistor is more nearly the dual counterpart of a vacuum tube than its analogue and that when excellent performance is known to be obtainable from a particular circuit configuration of which a vacuum tube is an element, then comparable performance can be expected from a transistor circuit which is the dual of the known vacuum tube circuit, and of which the transistor, itself an approximate dual of the vacuum tube, is an element. These Wallace applications show how to transform any known circuit conventionally associated with a vacuum tube into its dual counterpart which is adapted to be associated with a transistor. These Wallace applications have now become Patent 2,652,460, granted September 15, 1953, Patent 2,620,448, granted December 2, 1952 and Patent 2,681,996, granted June 22, 1954, respectively.

The application of the duality principles and transformations of the aforementioned Wallace applications to each of a number of conventional vacuum tube modulator circuits, leads to an equal number of novel transistor modulator circuits, each of which takes greater advantage of the peculiar characteristics of a transistor than does the conventional circuit from which it was derived. The present invention deals with the transistor circuit dual counterpart of the conventional plate modulator, constant current modulator, grid modulator, cathode modulator and balanced or suppressed carrier modulator.

The invention will be fully apprehended from the following detailed description of certain preferred illustrative embodiments thereof taken in connection with the appended drawings in which.

Figure 1:
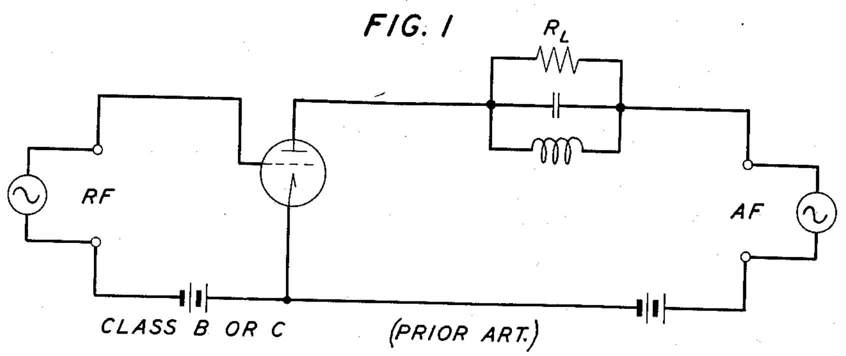
Fig. 1 is a schematic diagram showing a conventional vacuum tube plate modulator.

Referring now to the drawings, Fig. 1 shows a vacuum tube plate modulator comprising a vacuum tube triode, a plate voltage supply source, a grid bias voltage source, a carrier source connected to the grid, a modulator source connected to the plate, and a parallel tuned circuit shunted by a load in the plate circuit. The fixed plate voltage from the battery is supplemented by the output of the modulating signal source. In operation the tube is biased for class B or class C operation. Under these conditions its output is approximately proportional to the plate supply voltage provided the input is sufficiently large.

Figure 2:
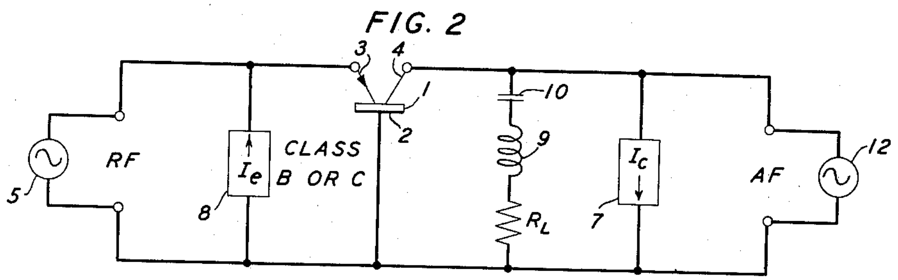
Fig. 2 is a schematic diagram showing a transistor modulator which is the dual counterpart of the circuit of Fig. 1.

Fig. 2 shows a dual counterpart of the circuit of Fig. 1 employing a transistor of the grounded base configuration and an associated external circuit which is at all points dual to the circuit of Fig. 1. The transistor itself comprises a semiconductive body 1 having a base electrode 2, an emitter 3, and a collector 4. A carrier source 5 is connected to the base and to the emitter. Collector current $I_c$ is supplied from a source 7 and emitter current is supplied from another source 8. A tuning coil and condenser 9, 10 are connected in series with a load $R_L$ to the collector and the base electrode, while a modulating signal source 12 is connected in shunt both with this tuned load circuit and with the collector current bias supply source 7. The emitter bias current $I_e$ is adjusted to bias the transistor to or beyond its collector voltage cut-off, thus providing for class B or class C operation. The substantially constant current $I_c$ from the source 7 is supplemented by the varying current from the modulating signal source 12. Under these conditions the amplitude of the carrier frequency output of the transistor amplifier is substantially proportional to the total instantaneous collector supply current and hence varies with the modulating current.

Figure 3:
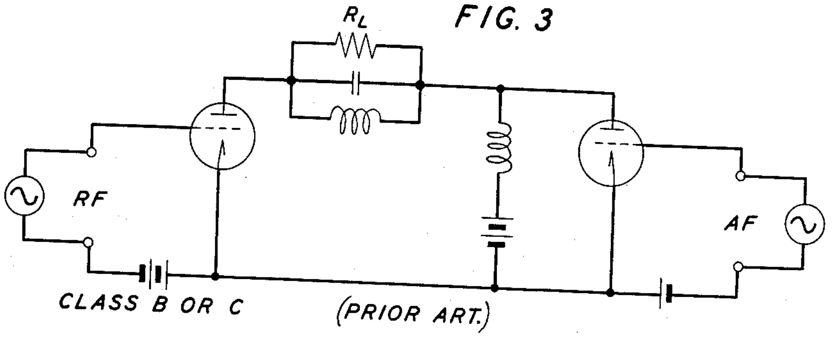
Fig. 3 is a schematic diagram of a conventional constant current vacuum tube modulator.

Fig. 3 shows a modification of the plate modulator known as a constant current modulator, because the total supply current is approximately constant. In this circuit two tubes are supplied in parallel from a single constant current power supply, approximated by a battery in series with a large inductor. The inductor serves as the load impedance for the right-hand tube which operates as a class A modulator, and the plate voltage of this modulator tube serves as the supply voltage of the left-hand tube which operates as a class B or C carrier frequency amplifier. The modulating signal is impressed on the grid of the modulator tube. The plate voltage of the modulator tube varies inversely with the modulating signal, and hence the instantaneous supply voltage of, and therefore the carrier frequency output of, the class B or C amplifier varies inversely with the modulating signal.

Figures 4A, 4B:
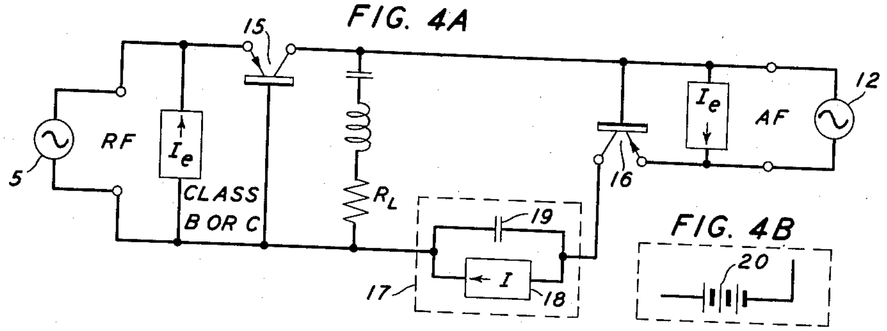
Fig. 4A is a schematic diagram showing a transistor modulator which is the dual counterpart of Fig. 3.
Fig. 4B shows an alternative to a part of Fig. 4.

Fig. 4A shows a transistor dual counterpart of the circuit of Fig. 3. The circuit comprises two transistors 15, 16 with their collector circuits in series, operated from a single constant voltage power supply 17, approximated here by a constant current source 18 in shunt with a large capacitor 19. This supply 17 could be replaced, as shown in Fig. 4B, by a battery 20. One of the transistors 15 operates as a class B or C amplifier for the carrier frequency of the source 5, while the other 16 operates as a class A modulator. The instantaneous supply current to the collector of the amplifier transistor 15 is the same as the collector current of the modulator transistor 16. The modulating signal is impressed from a source 12 on the emitter of the modulator transistor 16. The collector current of the modulator transistor 16 varies directly with the modulating signal. Hence the instantaneous supply current of, and therefore the amplitude of the carrier frequency output of, the amplifier 15 varies directly with the modulating signal of the source 12.

Figure 5:
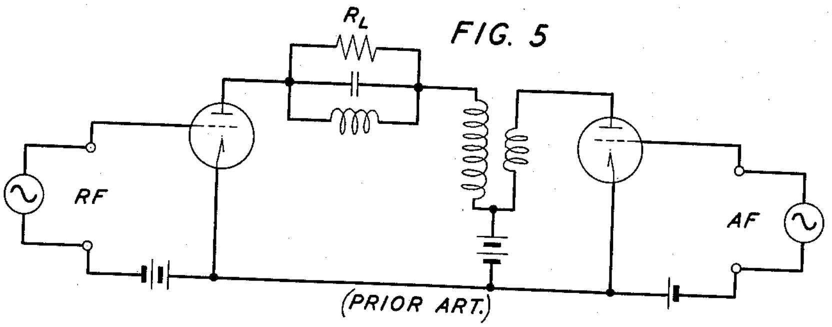
Fig. 5 shows a variant of the constant current modulator of Fig. 3.

Both the vacuum tube circuit of Fig. 3 and the transistor circuit of Figs. 4A and 4B suffer because the modulator can never reduce the supply voltage, or current as the case may be, to zero, and therefore 100 per cent modulation can never be attained. The circuits shown schematically in Figs. 5 and 6 correct this defect with a transformer, which amplifies slightly the variations in voltage or current of the modulator.

Figure 6:
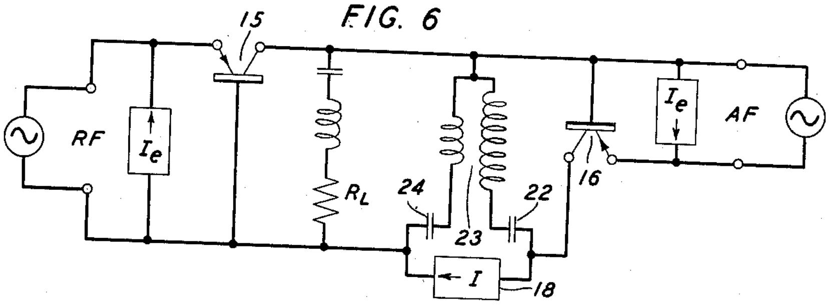
Fig. 6 shows the corresponding variant of the modulator of Fig. 4.

The plate voltage of the right-hand tube, i. e., the modulator, may be considered as the sum of two components: a direct component, equal to the battery voltage, and an alternating component across the winding of the transformer. The direct voltage component as applied to the left-hand tube, i. e., the class B or C amplifier, is unchanged by the transformer, while the alternating component is magnified by the transformer. In the circuit of Fig. 6, the dual counterpart of Fig. 5, the collector current of the modulator transistor 16 is divided into two parts, the direct component I of the source 18 and the alternating component which passes through a condenser 22. The former component is transmitted directly through the constant current supply source 18 while the latter is amplified by a transformer 23 and delivered through a condenser 24. Thus dualitywise to the circuit of Fig. 5, the alternating component of the supply current to the amplifier transistor 15 is amplified by the transformer 23 while the direct component remains unchanged.

The relation between the circuits of Figs. 4A and 6 may be further clarified by the following considerations. They are equivalent when the turns ratio of the transformer 23 is unity. In that case the transformer is equivalent simply to a large inductor, whose impedance ideally is infinite. It may therefore be removed, and the two condensers 22, 24 consolidated into one, as in Fig. 4A. The individual condensers 22, 24 in the two leads to the transformer 23 of Fig. 6 are necessary because the dual of a transformer whose windings have low direct-current impedance is a device whose windings have low direct-current admittance.

Figure 7:
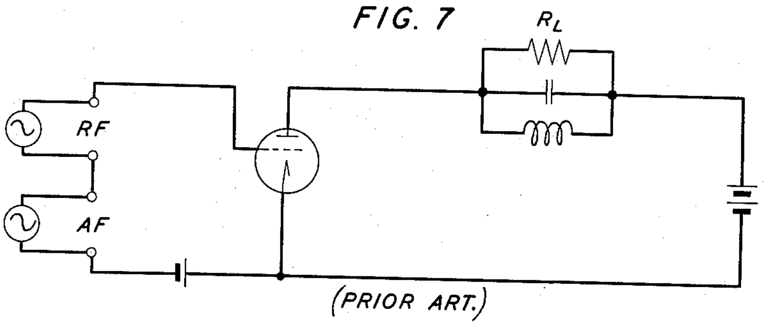
Fig. 7 is a schematic diagram showing a conventional vacuum tube grid modulator.
Figure 8:
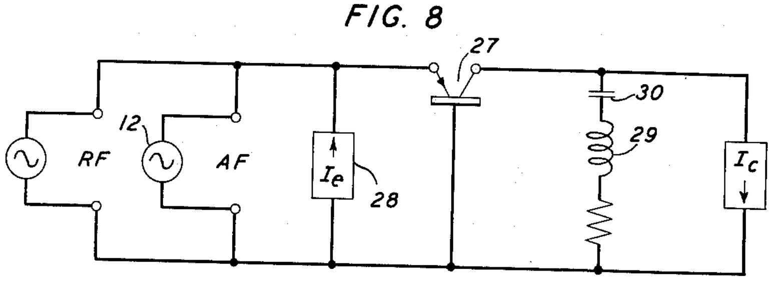
Fig. 8 is a schematic diagram showing a transistor modulator which is the dual counterpart of the circuit of Fig. 7.

Fig. 7 shows the circuit of a so-called grid modulator and Fig. 8 shows a transistor circuit which is dual to that of Fig. 7. This modulator operates on a different principle from the plate modulator. This and several of the modulators which will be discussed are non-linear amplifiers; that is, amplifiers in which the output is not a linear function of the input over the range of operation. When such an amplifier is fed with two signals at the same input point, one a high frequency signal and one a low frequency signal, the output of the amplifier contains components whose frequencies differ from those of the inputs as well as signals of the same frequencies as the input signals. These modulation products, as they are called, are signals whose frequencies are the sums and differences of multiples of the frequencies of the input signals. When the output is filtered with a band pass filter whose pass band is centered about the higher frequency signal and is more than twice as wide as the frequency deviation of the low frequency signal, the output of the filter contains a component which is the high frequency signal, amplitude modulated by the low frequency signal.

Modulators operating as described above can be divided roughly into two classes: in one the curve of output as a function of input is roughly two straight lines, joining at an obtuse angle, and the operating point is chosen to be the point where the lines join. In the other, the curve of output as a function of input is a smooth curve, and the operating point is usually chosen to be the point where the curvature is greatest. Inasmuch as no output versus input curve has a strictly sharp corner, many modulators are in an intermediate class, and operate as members of the first class when the magnitude of the excursion of the input is so large that most of the operation is over the straight portions of the curve, and operate as members of the second class if the excursion of the input is such that the operation is confined to the small curved region between the straight portions. Modulators of the second class are usually called square law modulators.

Returning to the grid modulator of Fig. 7, and its dual, Fig. 8, we may recall that above plate current cut-off the output voltage of a tube is approximately a linear function of its grid voltage, while below cut-off the output is constant and independent of grid voltage. Hence the circuit of Fig. 7 operates as a modulator when it is biased approximately to plate current cut-off. The dual circuit, Fig. 8, comprises a transistor 27 biased to collector voltage cut-off by adjustment of an emitter bias current $I_e$ derived from a current source 28. Here the collector voltage is a linear function of emitter current below cut-off, and zero above cut-off, and so the requirements for a modulator are satisfied. All that is needed further is a filter to select the desired modulation products. Because of the fact that a vacuum tube is a short-circuit-stable device, whereas a transistor is an open-circuit-stable device, it is customary to choose the filter in the vacuum tube circuit to have low input impedance outside the pass band, and therefore duality considerations indicate that the filter in the transistor circuit should have high input impedance outside the pass band. A simple series resonant circuit 29, 30 fills this requirement.

Figure 9:
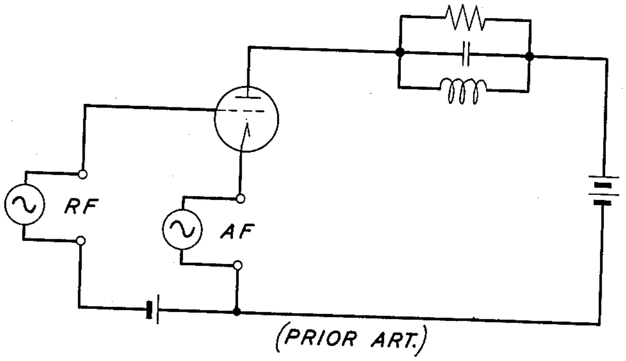
Fig. 9 is a schematic diagram showing a conventional vacuum tube cathode modulator.
Figure 10:
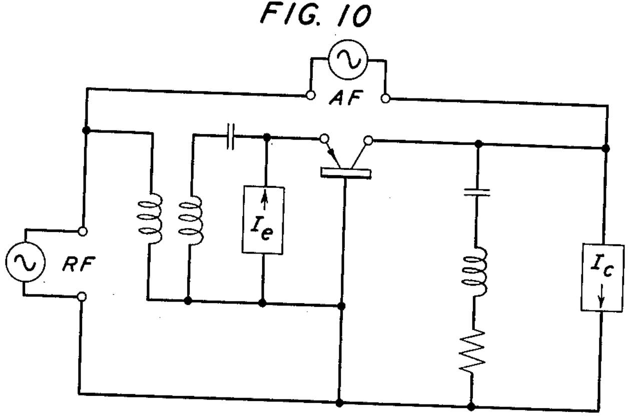
(PRIOR ART.) FIG. 10
Fig. 10 is a schematic diagram showing a transistor modulator which is the dual counterpart of the circuit of Fig. 9.

Figs. 9 and 10 show the circuits of a cathode modulator and its transistor dual. The circuit of Fig. 9 may be regarded as a combination of grid modulator and plate modulator; for if we consider the cathode as grounded, then the modulation signal is sent both to the grid and to the plate.

Figure 11:
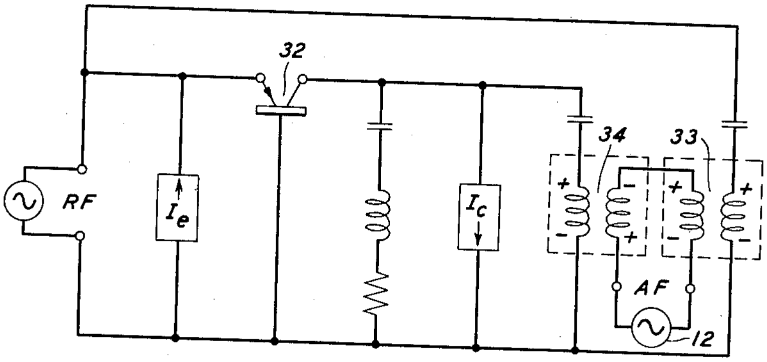
Fig. 11 is a schematic circuit diagram showing a variant of Fig. 10.

Fig. 10 is a transistor circuit which results from the direct application of duality transformations to the circuit of Fig. 9. Fig. 11 is a circuit equivalent to Fig. 10 differing from it in the placement of the transformer. The circuit of Fig. 11 has as one of its advantages the property that the transformers need transmit only the modulation current, while the transformer of Fig. 10 must transmit the carrier input current also.

The circuit of Fig. 11 comprises a transistor 32, biased to operate as a class B or class C amplifier, as in the circuits of Figs. 2 and 8. It differs from Figs. 2 and 8 in that whereas in Fig. 2 the modulating signal from the source 12 is applied to the collector and in Fig. 8 to the emitter, in Fig. 11 the modulating signal is applied both to the emitter through the transformer 33 and to the collector through the transformer 34. These modulating signals are applied to these two electrodes in phase.

Figure 12:
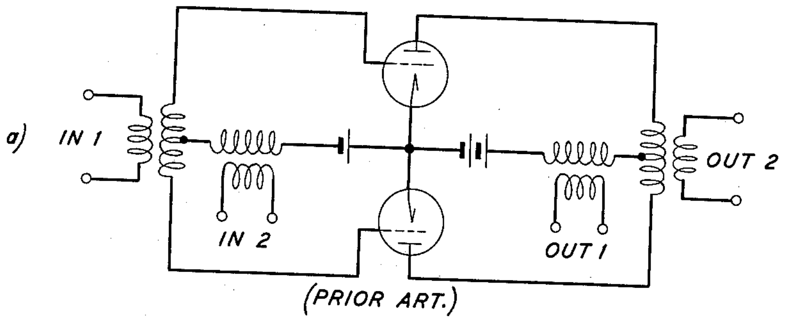
Fig. 12 shows a conventional vacuum tube balanced modulator.
Figure 13:
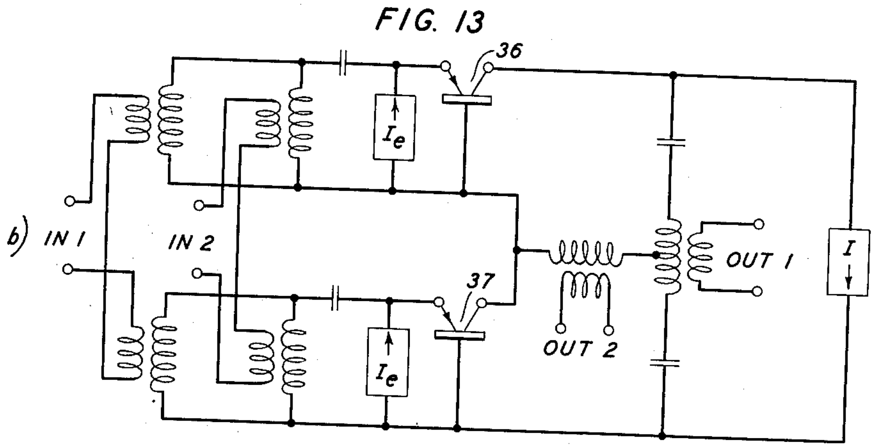
(PRIOR ART.) FIG. 13
Fig. 13 is a schematic diagram showing a transistor modulator which is the dual counterpart of the circuit of Fig. 12.
Figure 14:
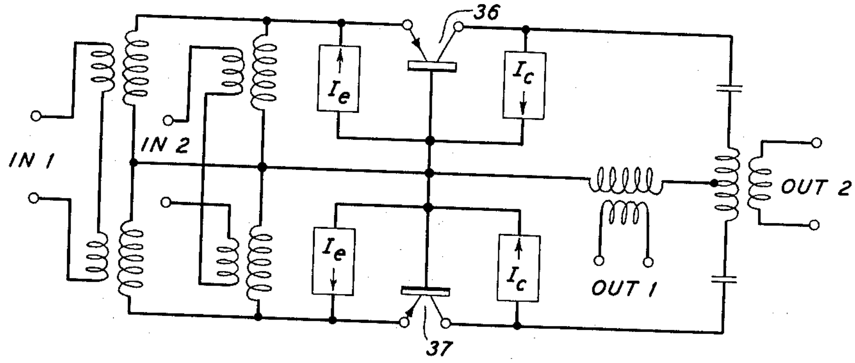
Fig. 14 is a schematic diagram showing a transistor modulator which is a variant of the modulator of Fig. 13.

The circuits of Figs. 7, 8, 9, 10 and 11 can be operated as large signal modulators or, with small inputs, as square law modulators. Furthermore, they can be combined in push-pull combinations to give balanced modulators. Such a modulator is illustrated in Fig. 12. Here two vacuum tubes are connected in parallel or push-pull, and one signal is fed into the pair as a push-pull amplifier while the other is fed into the pair as a parallel combination of two tubes. The symmetry of the circuit is such that at some points certain components of the signals and modulation products vanish. This can be used to produce suppressed carrier modulation as well as ordinary amplitude modulation. The dual circuit is shown in Fig. 13. This comprises two transistors 36, 37, connected in current push-pull from the standpoint of a signal input from the terminals $IN_1$ and in series from the standpoint of a signal input from the terminals $IN_2$. Fig. 14 shows a modification in which one of the transistors is inverted so that their base electrodes are now connected together. All of these balanced modulators can be operated as large or small signal devices, and in the latter case they are approximately square law modulators. A tabulation of the first order modulation products and the output terminals at which they appear is given below. It holds for each of the modulators of Figs. 11, 12, and 13:

| Input 1 | Input 2 | Output 1 | Output 2 |
|---|---|---|---|
| $\omega_1$ | ---------- | $2\omega_1$ | $\omega_1$ |
| ---------- | $\omega_1$ | $\omega_1, 2\omega_1$ | ---------- |
| $\omega_1, \omega_2$ | ---------- | $2\omega_1, 2\omega_2, \omega_1 \pm \omega_2$ | $\omega_1, \omega_2$ |
| $\omega_1$ | $\omega_2$ | $\omega_2, 2\omega_1, 2\omega_2$ | $\omega_1, \omega_1 \pm \omega_2$ |
| ---------- | $\omega_1, \omega_2$ | $\omega_1, \omega_2, 2\omega_1, 2\omega_2, \omega_1 \pm \omega_2$ | ---------- |

What is claimed is:

1. In combination with a source of carrier signals to be modulated and a source of modulating signals, each of said sources having two terminals, a transistor modulator which comprises a transistor having an emitter electrode, a collector electrode, and a base electrode, said transistor being characterized by collector output current which is in phase with its input emitter current, and an autotransformer having two extreme terminals and an intermediate terminal, said autotransformer and said modulating signal source being connected, by way of the extreme autotransformer terminals, in series between the emitter electrode and the collector electrode, said intermediate autotransformer terminal being directly connected to the base electrode, the two terminals of said carrier signal source being connected, respectively, to the base electrode of the transistor and to that terminal of the modulating signal source which is the more remote from the collector electrode of the transistor.

2. Apparatus as defined in claim 1 wherein said modulating signal source is connected between said autotransformer and said collector electrode.

3. In combination with apparatus as defined in claim 1, means for biasing said transistor substantially to collector voltage cutoff.

4. In combination with apparatus as defined in claim 1, a load, and a connection from the collector electrode to the load for applying to the load a voltage which is a modulation product of the signals of said two sources.

5. In combination with apparatus as defined in claim 1, a load interconnecting the collector electrode with the base electrode.

6. In combination with apparatus as defined in claim 1, a series resonant circuit comprising a coil and a condenser connected in series with the load, said resonant circuit being tuned to the frequency of the carrier signals.

7. In combination with apparatus as defined in claim 1, a source of a substantially constant current for supplying power to the electrodes of said transistor.

8. Apparatus for modulating carrier waves by a signal, which comprises a transistor having a base electrode, an emitter electrode and a collector electrode, means for biasing said transistor to or beyond collector voltage cut-off, means for applying said carrier waves between the base and emitter electrodes of said transistor, means for applying a modulating signal between the base and collector electrodes, and means for also applying said modulating signal in like phase between the base and emitter electrodes.

References Cited in the file of this patent

UNITED STATES PATENTS

| | | |
|---|---|---|
| 2,476,323 | Rack | July 19, 1949 |
| 2,486,776 | Barney | Nov. 1, 1949 |
| 2,620,448 | Wallace | Dec. 2, 1952 |

OTHER REFERENCES

"A Crystal that Amplifies," by C. E. Atkins, pages 39, 181–183 of "Radio and Television News" for Oct. 1949.

"Some Novel Circuits For Three Terminal Semiconductor Amplifier," by Webster et al., pages 5–16 of RCA Review for March 1949, vol. 10 issue No. 1.